Figure 1:
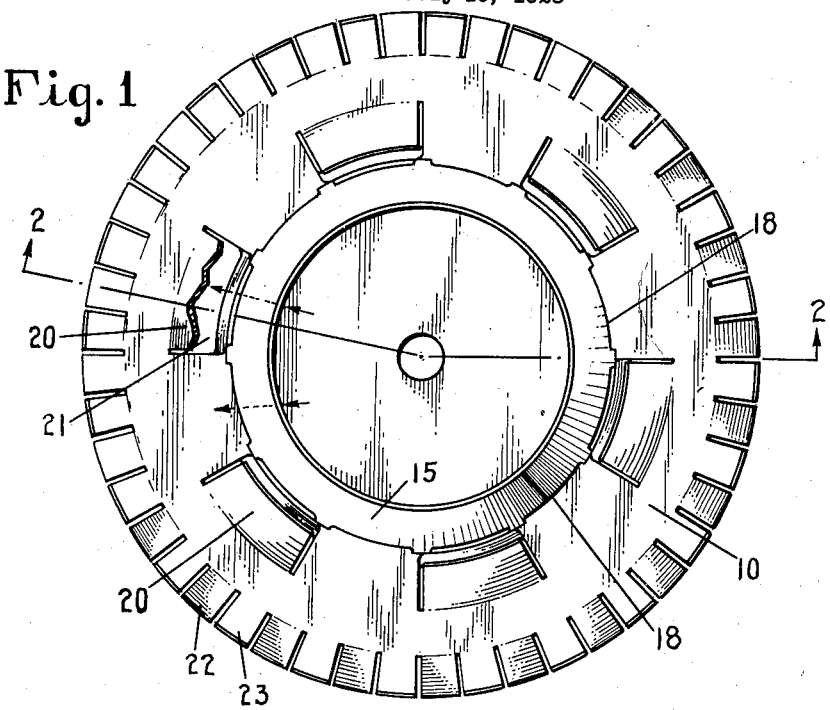

Nov. 20, 1928.

W. S. BOWEN 1,692,617

CENTRIFUGAL DISINTEGRATOR FOR LIQUIDS

Filed July 19, 1928

INVENTOR
WILLIAM SPENCER BOWEN
BY
ATTORNEY

Patented Nov. 20, 1928.

1,692,617

UNITED STATES PATENT OFFICE.

WILLIAM SPENCER BOWEN, OF WESTFIELD, NEW JERSEY.

CENTRIFUGAL DISINTEGRATOR FOR LIQUIDS.

Application filed July 19, 1928. Serial No 293,857.

The invention relates to the art of disintegration of liquids for providing the same in a finely divided or nebulous condition, and more particularly to a disintegrating device adapted for relatively high rotation and wherein centrifugal force is utilized in the disintegration of the liquid.

The invention has for its object to simplify the construction of this type of disintegrator and to render the same self-cleaning, that is to say, to prevent the accumulation thereon of solids, when solid-containing liquids are utilized, and obviate thereby unbalancing of the disintegrator. A further object of the invention to this end resides in the provision of means for effecting a washing action over both surfaces of a novel form of rotatable disk member; and the invention has for a still further object the thorough breaking up of a film of liquid flowing over said disk member, more particularly as the same is discharged therefrom. An additional object of the invention resides in the construction of a disintegrator which may conveniently and readily be fabricated in large part merely by simple stamping operations and which is withal of simple, rugged and substantial construction.

In carrying out the invention, a flat disk member is mounted for rotation at relatively high velocities, the liquid to be disintegrated being directed to a centrally disposed shell or container having outlets for the liquid along its lower edge adjacent the disk. Alternate outlets, moreover, are arranged to cooperate with openings through the disk beyond said shell which are provided with deflecting lips designed to intercept portions of the liqud film and spray and divert the same to the under face of the disk, whereby both surfaces will be wetted at all times. Circumferential teeth, also, are struck out from the disk, alternate teeth being inclined respectively upwardly and downwardly from the plane of the disk and serve to break up separate and discharge the respective films of liquid.

The nature of the invention, however, will best be understood when described in connection with the accompanying drawings, in which:

Fig. 1 is a plan view of the novel centrifugal disintegrator with a portion of one of the deflecting lips broken away.

Figure 2:
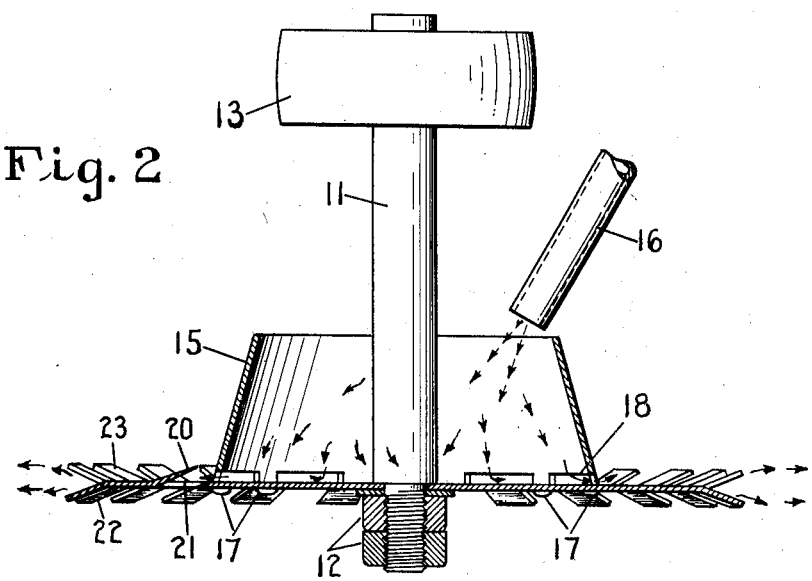

Fig. 2 is a vertical section taken on the line 2—2, Fig. 1 of the drawings, and shows also, in elevation, the driving shaft therefor and a liquid-supplying conduit for flowing into the disk liquid to be disintegrated.

Referring to the drawings, 10 designates a flat circular disk member of metal, preferably a metal not affected by the particular liquid to be disintegrated or nebulized thereby. The said disk is to be given a relatively high rotational velocity, usually about 8,000 to 10,000 R. P. M.; and to this end is rigidly secured to a driving shaft 11, as by the nuts 12 fitting over the threaded shouldered end of said shaft. A pulley 13 is attached, also, to the shaft and through which rotation may be imparted thereto in any desired manner from a suitable source of power (not shown).

There is centrally disposed on said disk a shell or container member 15 for initially confining the liquid to be disintegrated or nebulized, which liquid may be fed thereto through a supply conduit 16 communicating with a suitable source of liquid supply (not shown). The said shell is secured to the upper face of the disk 10, for example, by means of prongs 17 extending from its lower edge through suitably pierced openings of the disk, said prongs being upset over the under face of the latter; and the shell member is preferably frustro-conical with base adjacent the disk. Said shell, moreover, along its lower edge, is provided with a succession of preferably equidistantly spaced outlet openings 18 through which the liquid flows over the surface of the said disk.

Provision is made, also, for intercepting portions of the outflowing liquid which, it will be understood, is being urged radially outward under the centrifugal force developed in the rotation of said disk. For example, this may be effected by means of up-turned lips 20 which are struck up, preferably circularly, from the disk and opposite alternate outlet openings 18. These lips, also, are elevated above the surface of the disk to extend slightly beyond the upper edge of outlets 18 and will thus divert to the under surface of the disk the liquid flowing out of the particular outlet opening cooperating therewith. It is preferred, moreover, to bevel the two arcuate edges of the disk openings 21 thus afforded to provide a sharp dividing edge. Liquid will thus be caused to flow over both upper and under surfaces of the disk, wetting both of said surfaces at all times and thus preventing by the washing of the same formation of solid matter upon the under surface and as a result of which the balance of the disintegrator would be upset.

As the liquid films approach the circumference of the disk, provision is made for displacing the plane of such films as well as for breaking up the films at this point. For this purpose, the circumference of the disk is radially cut inward to provide a succession of teeth to throw off the liquid, alternate teeth 22 and 23 being turned, respectively, downwardly and upwardly from the plane of the disk; and a plurality of such tooth members correspond respectively to the sectors of the particular outlet openings of the upper surface and to the openings for admitting liquid to the under surface, while the number of teeth for each sector are equal with the half of each group serving to raise the liquid reaching the same along the upper surface and the other to depress the liquid reaching them along the lower surface. As these tooth members rotate at extremely high velocity, it will be appreciated that in cutting through the radially discharged liquid the latter will be still further broken up and disintegrated to extremely fine particles and a higly nebulized state.

I claim:

1. A centrifugal distintegrator for liquids having in combination a rotatable disk member, and a liquid container centrally secured thereto for receiving the liquid to be disintegrated and provided adjacent the disk surface with a series of outlet openings for the liquid, and the said disk having openings therethrough located beyond a number of the said outlet openings.

2. A centrifugal disintegrator for liquids having in combination a rotatable disk member, and a liquid container centrally secured thereto for receiving the liquid to be disintegrated and provided adjacent the disk surface with a series of outlet openings for the liquid, and the said disk having openings therethrough located beyond alternate outlet openings.

3. A centrifugal disintegrator for liquids having in combination a rotatable disk member, and a frustro-conical liquid container centrally secured thereto for receiving the liquid to be disintegrated and provided adjacent the disk surface with a series of outlet openings for the liquid, and the said disk having openings therethrough located beyond a number of the said outlet openings.

4. A centrifugal disintegrator for liquids having in combination a rotatable disk member, and a liquid container centrally secured thereto for receiving the liquid to be disintegrated and provided adjacent the disk surface with a series of equidistantly-spaced outlet openings for the liquid, and the said disk having equidistantly-spaced arcuate openings therethrough located beyond a number of the said outlet openings.

5. A centrifugal disintegrator for liquids having in combination a rotatable disk member, and a liquid container centrally secured thereto for receiving the liquid to be disintegrated and provided adjacent the disk surface with a series of outlet openings for the liquid, and the said disk having openings therethrough with beveled arcuate edges and located beyond a number of the said outlet openings.

6. A centrifugal disintegrator for liquids having in combination a rotatable disk member, and a liquid container centrally secured thereto for receiving the liquid to be disintegrated and provided adjacent the disk surface with a series of outlet openings for the liquid, and the said disk having up-turned lips struck therefrom to provide openings therethrough located beyond alternate outlet openings and to divert liquid issuing from the latter openings to the under surface of said disk.

7. A centrifugal disintegrator for liquids having in combination a rotatable disk member, and a liquid container centrally secured thereto for receiving the liquid to be disintegrated and provided adjacent the disk surface with a series of outlet openings for the liquid, and the said disk having openings therethrough located beyond a number of the said outlet openings and discharge teeth around its circumference.

8. A centrifugal disintegrator for liquids having in combination a rotatable disk member, and a liquid container centrally secured thereto for receiving the liquid to be disintegrated and provided adjacent the disk surface with a series of outlet openings for the liquid, and the said disk having openings therethrough located beyond a number of the said outlet openings and discharge teeth around its circumference, alternate teeth being inclined respectively upwardly and downwardly from the plane of the disk.

9. A centrifugal disintegrator for liquids having in combination a rotatable disk member, and a liquid container centrally secured thereto for receiving the liquid to be disintegrated and provided adjacent the disk surface with a series of outlet openings for the liquid, and the said disk having openings therethrough located beyond a number of the said outout openings and discharge teeth around its circumference, an equal number of teeth being associated with the respective openings and alternate teeth being inclined respectively upwardly and downwardly from the plane of the disk.

10. A centrifugal disintegrator for liquids having in combination a rotatable disk member, and a liquid container centrally secured thereto for receiving the liquid to be disintegrated and provided adjacent the disk surface with a series of outlet openings for the liquid, and the said disk having up-turned lips struck therefrom to provide openings therethrough located beyond a number of the said outlet openings to divert liquid issuing from the latter openings to the under surface of said disk and the edge of a lip extending above the upper edge of a corresponding outlet.

11. A centrifugal disintegrator liquids having in combination a rotatable disk member, and a liquid container centrally secured thereto for receiving the liquid to be disintegrated and provided adjacent the disk surface with a series of equidistantly-spaced outlet openings for the liquid, and the said disk having equidistantly-spaced arcuate openings therethrough located beyond corresponding outlet openings and also discharge teeth around its circumference, alternate teeth being inclined respectively upwardly and downwardly from the plane of the disk.

12. A centrifugal disintegrator for liquids having in combination a rotatable disk member, and a liquid container centrally secured thereto for receiving the liquid to be disintegrated and provided adjacent the disk surface with a series of equidistantly-spaced outlet openings for the liquid, and the said disk having up-turned lips struck therefrom to provide a series of equidistantly-spaced arcuate openings therethrough for the liquid and corresponding to said outlet openings, said disk being also radially cut inward from its circumference to provide a succession of teeth for throwing off the liquid, and alternate teeth being inclined respectively upwardly and downwardly from the plane of said disk.

In testimony whereof I affix my signature.

WILLIAM SPENCER BOWEN.